United States Patent
VanBlon et al.

(10) Patent No.: US 10,048,929 B2
(45) Date of Patent: Aug. 14, 2018

(54) ADJUSTING VOLUME SETTINGS BASED ON PROXIMITY AND ACTIVITY DATA

(71) Applicant: LENOVO (Singapore) PTE. LTD., New Tech Park (SG)

(72) Inventors: Russell Speight VanBlon, Raleigh, NC (US); John Carl Mese, Cary, NC (US); Nathan J. Peterson, Oxford, NC (US); Arnold S. Weksler, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 8 days.

(21) Appl. No.: 15/080,123

(22) Filed: Mar. 24, 2016

(65) Prior Publication Data

US 2017/0277506 A1 Sep. 28, 2017

(51) Int. Cl.
| | | |
|---|---|---|
| G06F 17/00 | (2006.01) | |
| G06F 3/16 | (2006.01) | |
| H04W 4/80 | (2018.01) | |

(52) U.S. Cl.
CPC .............. G06F 3/165 (2013.01); H04W 4/80 (2018.02)

(58) Field of Classification Search
CPC ....... H04R 2430/01; H04S 7/30; H04S 7/302; H04S 7/303; H04S 2400/13
See application file for complete search history.

(56) References Cited

U.S. PATENT DOCUMENTS

| | | | | |
|---|---|---|---|---|
| 2006/0062401 A1* | 3/2006 | Neervoort | ............... | H04S 7/303 381/82 |
| 2008/0107293 A1* | 5/2008 | Rosen | ............... | H04S 7/30 381/307 |
| 2011/0069841 A1* | 3/2011 | Angeloff | ............... | H03G 3/30 381/17 |
| 2012/0020486 A1* | 1/2012 | Fried | ............... | H03G 3/32 381/58 |
| 2013/0028443 A1* | 1/2013 | Pance | ............... | G06F 3/167 381/107 |
| 2013/0156198 A1* | 6/2013 | Kim | ............... | H04R 1/323 381/17 |
| 2013/0202132 A1* | 8/2013 | Zurek | ............... | H04M 1/605 381/107 |
| 2013/0279706 A1* | 10/2013 | Marti | ............... | G06F 3/165 381/57 |
| 2015/0010169 A1* | 1/2015 | Popova | ............... | H04S 7/303 381/107 |
| 2017/0165525 A1* | 6/2017 | Tellez | ............... | A63B 69/0028 |

FOREIGN PATENT DOCUMENTS

DE            69902487 T2     12/2002

* cited by examiner

*Primary Examiner* — Andrew C Flanders
(74) *Attorney, Agent, or Firm* — Kunzler, PC

(57) ABSTRACT

Apparatuses, systems, methods, and computer program products are disclosed for adjusting volume settings based on proximity and activity data. A proximity module determines a proximity to an information handling device in response to detecting the information handling device. An activity module receives context data from the information handling device. The context data describes an activity state of a user of the information handling device. A volume module adjusts a volume setting as a function of the proximity to the information handling device and the activity state of the user.

20 Claims, 5 Drawing Sheets

ADJUSTING VOLUME SETTINGS BASED ON PROXIMITY AND ACTIVITY DATA

FIELD

The subject matter disclosed herein relates to device volume settings and more particularly relates to adjusting device volume settings based on a proximity to a different device.

BACKGROUND

Devices such as smart phones and tablet computers may be configured to generate sounds to notify a user of an event such as a ringer for an incoming phone call, a sound to indicate a received text message, or the like. However, these sounds may interrupt others at inappropriate times, e.g., while someone else is sleeping, watching TV, reading, or the like.

BRIEF SUMMARY

An apparatus for adjusting volume settings based on proximity and activity data is disclosed. A method and computer program product also perform the functions of the apparatus. In one embodiment, an apparatus includes a processor and a memory that stores code executable by the processor. The code, in one embodiment, is executable by a processor to determine a proximity to an information handling device in response to detecting the information handling device.

The code, in a further embodiment, is executable by a processor to receive context data from an information handling device. Context data may describe an activity state of a user of an information handling device. In some embodiments, the code is executable by a processor to adjust a volume setting as a function of a proximity to an information handling device and an activity state of a user.

The code, in certain embodiments, is further executable by a processor to determine, from context data, whether a user's activity state is a quiet state. Context data may include one or more of biological data, calendar data, and location data. In one embodiment, a predetermined volume level is determined according to a determined proximity to an information handling device.

In one embodiment, the code is further executable by a processor to connect to the information handling device using a short-range wireless communication protocol. A short-range wireless communication protocol may be selected from the group consisting of a Bluetooth® protocol, a near field communication ("NFC") protocol, an infrared protocol, and a Wi-Fi protocol.

In some embodiments, the code is further executable by a processor to determine a different proximity to an information handling device in response to detecting a change in a determined proximity, and adjust a volume setting as a function of the different proximity.

In certain embodiments, the code is further executable by a processor to receive different context data from an information handling device in response to determining a change in an activity state of a user, and adjust a volume setting as a function of the user's changed activity state.

In a further embodiment, the code is further executable by a processor to adjust a volume setting in response to one of determining a proximity to an information handling device and detecting an event that generates an audible sound. In some embodiments, the code is further executable by a processor to adjust a volume setting in response to determining an information handling device is an authorized information handling device.

In one embodiment, the code is further executable by a processor to notify a user that a volume setting has been changed in response to a volume setting being adjusted. In some embodiments, a proximity to an information handling device is determined using one or more sensors, which may be selected from a group consisting of a Bluetooth® communication sensor, a signal strength sensor, a location sensor, an altimeter, and a proximity sensor.

In one embodiment, an information handling device is selected from a group consisting of a wearable activity tracker, a smart phone, and a tablet computer. In a further embodiment, a volume setting is associated with one or more of a speakerphone volume, a notification volume, a ringer volume, a music volume, a video volume, a game volume, and a voice response volume.

A method, in one embodiment, includes determining, by use of a processor, a proximity to an information handling device in response to detecting the information handling device. A method, in a further embodiment, includes receiving context data from an information handling device. Context data may describe an activity state of a user of an information handling device. In some embodiments, a method includes adjusting a volume setting as a function of a proximity to an information handling device and an activity state of a user.

A method, in one embodiment, includes determining, from context data, whether a user's activity state is a quiet state. Context data may include one or more of biological data, calendar data, and location data. In some embodiments, a volume setting is adjusted by decreasing a volume level below a predetermined volume level in response to determining that a user's activity state is a quiet state. A predetermined volume level may be determined according to a determined proximity to an information handling device.

A method, in certain embodiments, includes determining a different proximity to an information handling device in response to detecting a change in a determined proximity, and adjusting a volume setting as a function of a different proximity. In some embodiments, a method includes receiving different context data from an information handling device in response to determining a change in the activity state of a user, and adjusting a volume setting as a function of the user's changed activity state.

In one embodiment, a method includes resetting a volume setting to a previous volume setting in response to determining one or more of an information handling device is outside of a communication proximity and a user's activity state is not a quiet state.

In one embodiment, a program product includes a computer readable storage medium that stores code executable by a processor. In one embodiment, the executable code includes code to perform determining a proximity to an information handling device in response to detecting the information handling device. In a further embodiment, the executable code includes code to perform receiving context data from an information handling device. Context data may describe an activity state of a user of an information handling device. In some embodiments, the executable code includes code to perform adjusting a volume setting as a function of a proximity to an information handling device and an activity state of a user.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
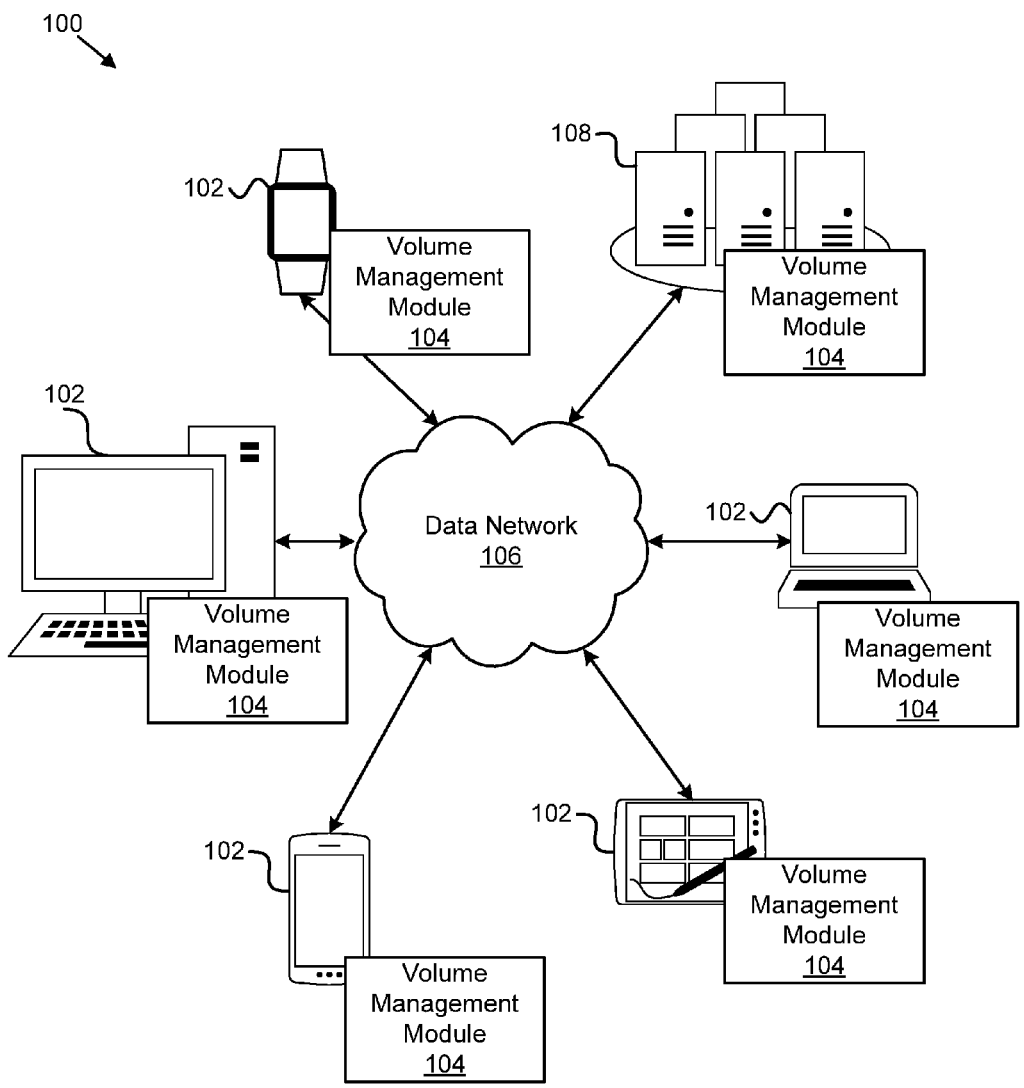
FIG. 1 is a schematic block diagram illustrating one embodiment of a system for adjusting volume settings based on proximity and activity data.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is a schematic block diagram illustrating one embodiment of a system 100 for adjusting volume settings based on proximity and activity data. In one embodiment, the system 100 includes one or more information handling devices 102, one or more volume management modules 104, one or more data networks 106, and one or more servers 108. In certain embodiments, even though a specific number of information handling devices 102, volume management modules 104, data networks 106, and servers 108 are depicted in FIG. 1, one of skill in the art will recognize, in light of this disclosure, that any number of information handling devices 102, volume management modules 104, data networks 106, and servers 108 may be included in the system 100 for proximity-based volume adjustment.

In one embodiment, the system 100 includes one or more information handling devices 102. The information handling devices 102 may include one or more of a desktop computer, a laptop computer, a tablet computer, a smart phone, a set-top box, a gaming console, a smart TV, a smart watch, a fitness band or other wearable activity tracking device, an optical head-mounted display (e.g., a virtual reality headset, smart glasses, or the like), an HDMI or other electronic display dongle, a personal digital assistant, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In certain embodiments, the information handling devices 102 are communicatively coupled one or more other information handling devices 102 and/or to one or more servers 108 over a data network 106, described below. The information handling devices 102, in a further embodiment, are configured to execute various programs, program code, applications, instructions, functions, and/or the like, which may access, store, download, upload, and/or the like data located on one or more servers 108.

In one embodiment, the volume management module 104 is configured to adjust a volume setting of an information handling device 102 (e.g., a target device) based on a proximity to one or more different information handling devices 102 (e.g., trigger devices). In embodiment, the volume management module 104 determines a proximity to an information handling device 102, e.g., a trigger device, in response to detecting the information handling device 102. In a further embodiment, the volume management module 104 receives context data from the detected information handling device 102. The context data may describe an activity state of a user of the information handling device 102. The volume management module 104, in a further embodiment, adjusts a volume setting, e.g., on the target device, as a function of the determined proximity to the detected information handling device 102 and the activity state of the user. The volume management module 104, including its various sub-modules 202-306, may be located on one or more information handling devices 102 in the system 100, one or more servers 108, one or more network devices, and/or the like. The volume management module 104 is described in more detail below with reference to FIGS. 2 and 3.

In various embodiments, the volume management module 104 may be embodied as a hardware appliance that can be installed or deployed on an information handling device 102, on a server 108, or elsewhere on the data network 106. In certain embodiments, the volume management module 104 may include a hardware device such as a secure hardware dongle or other hardware appliance device (e.g., a set-top box, a network appliance, or the like) that attaches to a device such as a laptop computer, a server 108, a tablet computer, a smart phone, or the like, either by a wired connection (e.g., a USB connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the volume management module 104 may include a power interface, a wired and/or wireless network interface, a graphical interface that attaches to a display, and/or a semiconductor integrated circuit device as described below, configured to perform the functions described herein with regard to the volume management module 104.

The volume management module 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the volume management module 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the volume management module 104.

The semiconductor integrated circuit device or other hardware appliance of the volume management module 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the volume management module 104 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The one or more servers 108, in one embodiment, may be embodied as blade servers, mainframe servers, tower servers, rack servers, and/or the like. The one or more servers 108 may be configured as a mail server, a web server, an application server, an FTP server, a media server, a data server, a web server, a file server, a virtual server, and/or the like. The one or more servers 108 may be communicatively coupled (e.g., networked) over a data network 106 to one or more information handling devices 102. The one or more servers 108 may store data associated with an information handling device, with a user, and/or the like. For example, a server 108 may store location data for an information handling device 102, activity data for a user, calendar/schedule data, biometric data, and/or other context data describing a location of an information handling device 102 and/or activity related data associated with a user.

Figure 2:
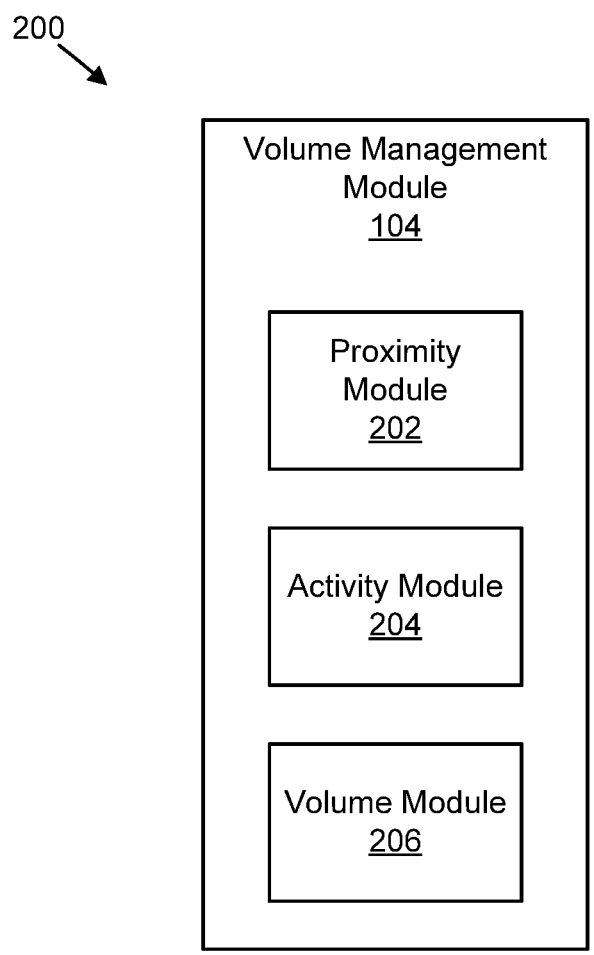
FIG. 2 is a schematic block diagram illustrating one embodiment of a module for adjusting volume settings based on proximity and activity data.

FIG. 2 is a schematic block diagram illustrating one embodiment of an apparatus 200 for adjusting volume settings based on proximity and activity data. In one embodiment, the apparatus 200 includes an embodiments of a volume management module 104. The volume management module 104, in some embodiments, includes one or more of a proximity module 202, an activity module 204, and a volume module 206, which are described in more detail below.

In one embodiment, the proximity module 202 is configured to determine a proximity to an information handling device 102, e.g., a trigger device. In certain embodiments, the proximity module 202 determines a proximity to a trigger device in response to detecting the trigger device. In one embodiment, the proximity module 202 detects a trigger device is within a proximity of a target device based on data received from one or more sensors such as proximity sensors, motion sensors, infrared sensors, short range wireless communication sensors (e.g., Bluetooth®, NFC, Wi-Fi, radio, and/or the like), wireless signal strength sensors, location sensors (e.g., global positioning system ("GPS") sensors), and/or the like. For example, the proximity module 202 may detect a smart phone, the trigger device, is within a short range wireless communication proximity of another smart phone, the target device, based on data received from a Bluetooth® sensor on the target device that is communicatively coupled to the proximity module 202.

The proximity module 202 may determine the distance to the trigger device based on a detected signal strength using signal sensors, a Bluetooth® or other short-range wireless communication distance detection method, data from a location service, a wireless triangulation method, sound sensors, light sensors, and/or the like. For example, if the proximity module 202 is located on a user's smart phone, the proximity module 202 may detect a wireless fitness band of another user by detecting a Bluetooth® signal emitted by the wireless fitness band. Furthermore, the proximity module 202 may use the detected Bluetooth® signal to determine a distance between the smart phone and the wireless fitness band. If both the smart phone and the wireless fitness band include location sensors, such as a GPS sensor, the proximity module 202 may determine the location of both devices and derive a distance between the devices based on their detected locations.

In one embodiment, the proximity module 202 determines a vertical location of a target device and/or a trigger device based on data collected by one or more sensors, such as an altimeter, by a Wi-Fi access point connected to an information handling device 102, by a wireless triangulation location method, and/or the like. For example, the proximity module 202 may determine that a tablet computer is located in a basement bedroom and that a laptop computer is located in a $2^{nd}$ floor bedroom of a house based on altimeter data and/or by determining that the devices are connected to different wireless access points in the house—the tablet computer connected to the basement access point and the laptop computer connected to the $2^{nd}$ floor access point. Based on the vertical location data, the proximity module 202 may determine how "proximate" the target and trigger devices are to each other if they are located on different floors.

The activity module 204, in one embodiment, is configured to receive context data from a detected information handling device 102, the trigger device. The context data, as used herein, may include data that describes an activity state of a user of the trigger device, e.g., a quiet state, an awake state, an active state, a sleeping state, and/or the like. In certain embodiments, the context data may include biometric data, which may indicate whether the user is awake, is falling asleep, is asleep, is exercising, is sitting, and/or the like, calendar/schedule data, location data, data from one or more sensors such as accelerometers, vibration sensors, and/or the like that may indicate a user's activity, and/or the like.

For example, the activity module 204 may receive biometric data from a wireless activity tracker worn by a user that indicates that the user is asleep. In another example, the activity module 204 may receive accelerometer data from a user's smart phone that indicates the user is walking around. In a further example, the activity module 204 may receive schedule data for a user from the user's tablet computer that indicates the user is attending a currently scheduled meeting.

In one embodiment, the volume module 206 is configured to adjust one or more volume levels or settings of an information handling device 102, e.g., the target device, as a function of the determined proximity of another information handling device 102, e.g., the trigger device, and the activity state of the user as determined based on the received context data. In certain embodiments, the volume module 206 decreases a volume level below a predetermined volume level in response to determining that the user's activity state is a quiet state.

For example, a user may walk into his bedroom with his smart phone. A proximity module 202 located on or associated with the smart phone may detect that a fitness tracker (e.g., a Fitbit®) being worn by the user's wife is within a proximity of the user's smart phone. The proximity module 202 may also determine that the user's smart phone is within five feet of the wife's fitness tracker. The activity module 204 may request and/or receive context data from the fitness tracker that indicates an activity state of the user. In this example, the context data may include biometric data that indicates the wife is asleep.

Continuing with the above example, the volume module 206 may adjust one or more volume settings on the user's smart phone as a function of the proximity of the smart phone to the fitness tracker and determining that the user is asleep. In this example, the volume module 206 may silence the volume on the user's smart phone so that no sounds are generated in response to phone calls, notifications, text messages, games, music, and/or the like because the context data indicated that the wife is asleep and the determined distance between the devices is only five feet. In this manner, the volume management module 104 may control the volume of a target device based on activities of other users as determined by the context data collected by the other users' devices and the proximity to the other users' devices (e.g., the trigger devices).

In certain embodiments, the volume module 206 adjusts a volume level of a target device based on a type of event that generates a sound on the target device. In certain embodiments, the volume module 206 adjusts a phone call ringer volume, a text message notification volume, a push notification volume, an email notification volume, a game volume, a music volume, a video volume, a volume associated with a speakerphone, a voice response volume (e.g., sounds generated by Google Now®, Siri®, Cortana®, or the like), and/or the like. For example, the volume module 206 may silence a ringer on a smart phone for incoming phone calls, while only reducing the volume level for text message notifications to a certain level.

In one embodiment, the volume module 206 adjusts volume levels of target device according to one or more contacts that are contacting the target device. For example, the volume module 206, when adjusting the volume level of a smart phone's ringer, may silence the ringer when receiving phone calls from Bob, but only reduce the volume to a certain level for phone calls received from Jill.

In some embodiments, the volume module 206 adjusts a volume level of a target device based on additional input received from a plurality of different trigger devices that are within a communication proximity of the target device. For example, s volume module 206 located on an iPhone® may detect that an Android® phone is within a proximity of the iPhone®; however, based on the context data received from the Android® phone, the volume module 206 may determine that the user is awake and active, and is therefore not in a quiet state. Thus, the volume module 206 may not adjust a volume setting of the iPhone® based on the proximity and/or context data of the Android® phone. In some embodiments, however, the iPhone® may also receive data from other devices within a proximity of the iPhone® and the Android® phone. For example, the volume module 206 may receive data from a smart TV that indicates the smart TV is on, which may indicate that users are watching the smart TV, such as the user of the iPhone®. Accordingly, the volume module 206 may reduce one or more volume settings of the iPhone® based on the smart TV data. Other external data may be used such as sound data received by a microphone on the target device (e.g., being able to hear TV sound to determine the TV is on), motion data from one or more motion sensors, and/or the like.

In another example embodiment, the activity module 206 may receive context data from a home office computer that includes schedule/calendar data for family members in the home (e.g., school schedule, bedtime schedule, or the like).

In such an embodiment, the volume module 206 may adjust a volume setting of a target device based on the calendar data and/or the proximity to a trigger device, location data, and/or the like.

For example, if the calendar data indicates that a user's child goes to bed at 7:00 PM, the volume module 206 may decrease and/or silence a tablet computer's volume when the tablet computer is within a proximity of one of the child's bedroom (e.g., as the distance between the tablet computer and the child's bedroom decreases), as determined from location data associated with the tablet computer, the child's bedroom, and/or location data associated with a trigger device that may be located within the child's bedroom. Furthermore, as the tablet computer moves away from the child's bedroom (e.g., as the distance between the tablet computer and the child's bedroom increases), the volume module 206 may adjust the volume settings of the tablet computer by increasing a volume setting until it reaches its previously set volume level.

In another example embodiment, the activity module 204 may receive calendar data from a device in a user's office that indicates the user is scheduled for a meeting at 1:00 PM. As the meeting time approaches, the volume module 206 may silence the user's smart phone so that he is not disturbed during the meeting. The volume module 206, after the scheduled meeting time has passed, may reset the volume settings on the user's smart phone to its previous settings.

In one embodiment, as described above, the volume module 206 may decrease a volume level of an information handling device 102 below a predetermined or threshold volume level. The predetermined volume level may be set based on the determined proximity to a trigger device. In other words, the volume module 206 may continuously reduce the volume as a target device approaches a trigger device that also indicates the user is in a quiet state. For example, if a user is sleeping, the volume module 206 of a smart phone approaching the sleeping user's device may reduce the smart phone's volume level, and continue to reduce the volume level, as the smart phone is brought within a closer proximity of the sleeping user's device.

In certain embodiments, as described above, the volume module 206 resets the volume settings of a target device in response to the proximity module 202 determining that the target device is not within a proximity of a trigger device; in response to the activity module 204 receiving context data that indicates another user is no longer in a quiet state; and/or the like. For example, the volume module 206 may reset a phone's ringer volume to a previous setting in response to determining that another user woke up based on biometric data received by the activity module 204 from the awakened user's wearable fitness tracker.

In one embodiment, the volume module 206 adjusts a volume setting of a device when the proximity module 202 determines that the target device is within a threshold proximity of a trigger device or when the activity module 204 detects that the activity state of the user has changed to a quiet state. In some embodiments, the volume module 206 does not adjust the volume setting of a target device until the target device receives or detects an event that generates an audible sound. For example, the volume module 206 may not adjust a phone's ringer volume until a phone call is received. Thus, the volume module 206 may adjust volume settings of a target device on an "as needed" basis.

In some embodiments, the proximity module 202 determines a different or new proximity to a trigger device in response to detecting a change in a previously determined proximity. In such an embodiment, the proximity module 202 may periodically check a target device's proximity in relation to a previously detected trigger device. If a previously determined proximity is different than a currently determined proximity, then the proximity module 202 may determine the new proximity to the trigger device, e.g., the distance between the proximity module 202, or a target device where the proximity module 202 is located, and the trigger device. The volume module 206 may then adjust one or more volume settings of the target device as a function of the different proximity, e.g., the volume module 206 may increase the volume if the distance between the target device and the trigger device is greater than a previously determined distance or decrease the volume if the distance between the target device and the trigger device is less than a previously determined distance.

In certain embodiments, the activity module 204 receives new context data from a trigger device. In such an embodiment, the activity module 204 may periodically request and/or receive context data from the trigger device to determine whether the activity state of the user has changed. If the activity state of the user has changed, e.g., from a quiet state to an active state, or vice versa, the volume module 206 may adjust one or more volume settings of the device as a function of the new activity state, e.g., the volume module 206 may increase the volume if the activity state of another user, as indicated by the context data, changes from a quiet state to an active state, or decrease the volume if the activity state of the other user changes from an active state to a quiet state.

Figure 3:
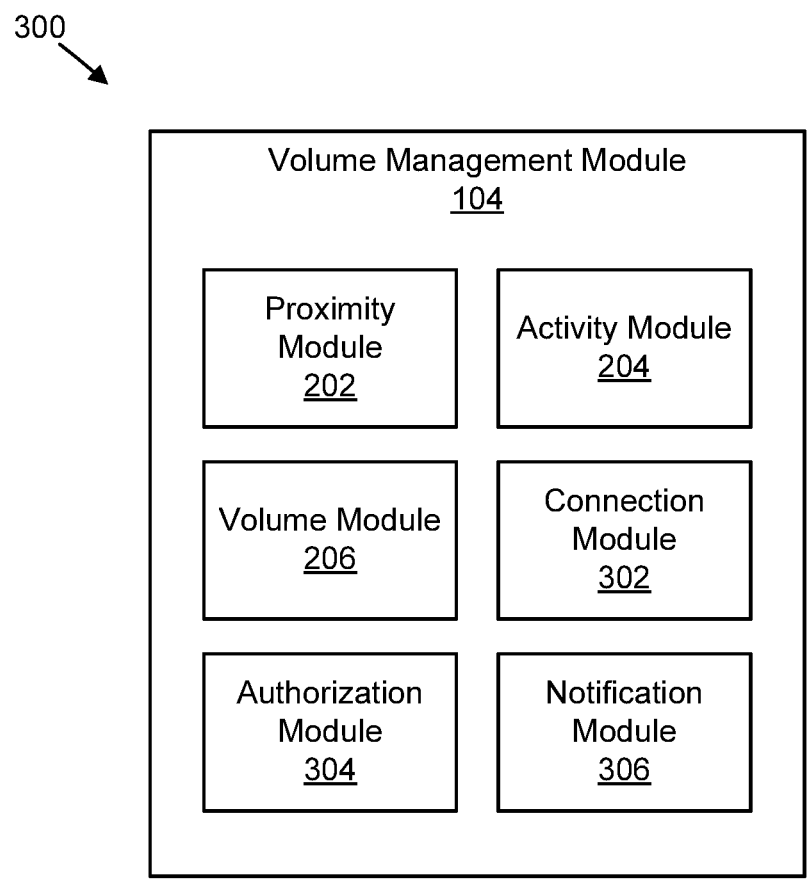
FIG. 3 is a schematic block diagram illustrating one embodiment of another module for adjusting volume settings based on proximity and activity data.

FIG. 3 is a schematic block diagram illustrating one embodiment of an apparatus 300 for adjusting volume settings based on proximity and activity data. In one embodiment, the apparatus 300 includes an embodiment of a volume management module 104. In certain embodiments, the volume management module 104 includes one or more of a proximity module 202, an activity module 204, and a volume module 206, which may be substantially similar to the proximity module 202, the activity module 204, and the volume module 206 described above with reference to FIG. 2. Furthermore, the volume management module 104 may include one or more of a connection module 302, an authorization module 304, and a notification module 306, which are described in more detail below.

The connection module 302, in one embodiment, is configured to connect to the detected trigger device. In certain embodiments, the connection module 302 connects to the trigger device using a short-range wireless communication protocol such as a Bluetooth® protocol, an NFC communication protocol, an infrared protocol, a Wi-Fi protocol, a radio protocol, and/or the like. For example, in response to the proximity module 202 detecting a laptop within a close proximity of a user's smart phone, the connection module 302 may select a communication protocol that is compatible with both devices to initiate communication with the laptop. After communication is established, the activity module 204 may request context data from the laptop including user data, schedule data, location data, and/or the like.

In one embodiment, the authorization module 304 is configured to determine whether a detected trigger device is a device that is authorized to communicate with a target device. The authorization module 304, in some embodiments, maintains a listing of preselected, predetermined, authorized, registered, and/or the like trigger devices that are allowed to communicate with the target device. In such an embodiment, the authorization module 304 may identify an authorized trigger device using an identifier for the trigger device such as an IP address, a MAC address, a device name, and/or the like.

The authorization module 304, in some embodiments, registers a trigger device as an authorized device in response to user input. For example, a user may provide a device identifier for a wearable fitness tracker to the authorization module 304 to register the wearable fitness tracker as an authorized device, which may allow the user to "opt-in" to allowing the wearable fitness tracker, or a user's activity detected by the wearable fitness tracker, to control the volume on the user's device. In certain embodiments, a trigger device may request permission to communicate with the target device in response to the target device detecting the trigger device. For example, the authorization module 304 may receive a request over a Bluetooth® connection with a trigger device requesting permission to send the authorization module 304 context data and/or other types of data.

In one embodiment, the notification module 306 is configured to notify a user that a volume setting on the target device has been adjusted after the volume module 206 adjusts the volume setting. For example, the notification module 306 may present a notification on a user's smart phone to indicate that the volume for text message notifications has been muted because the smart phone was within a threshold proximity of the user's sleeping spouse, as determined based on the context data received from the user's spouse's fitness band. Similarly, the notification module 306 may maintain a log, a history, and/or the like of instances when the volume module 206 adjusted the volume settings of a target device, including which settings were adjusted, when the settings were adjusted, why the settings were adjusted, and/or the like.

Figure 4:
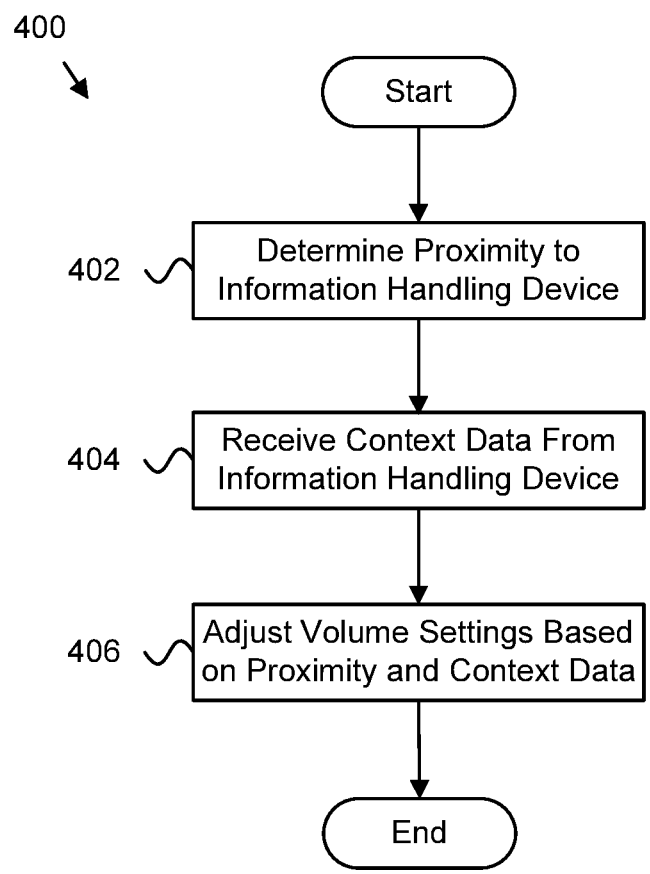
FIG. 4 is a schematic flow chart diagram illustrating one embodiment of a method for adjusting volume settings based on proximity and activity data.

FIG. 4 is a schematic flow chart diagram illustrating one embodiment of a method 400 for adjusting volume settings based on proximity and activity data. In one embodiment, the method 400 begins, and a proximity module 202 determines 402 a proximity to an information handling device 102, e.g., a trigger device, in response to detecting the trigger device. In a further embodiment, an activity module 204 receives 404 context data from the trigger device, which may describe an activity state of a user of the trigger device. In various embodiments, a volume module 206 adjusts 406 a volume setting of a target device as a function of the proximity to the trigger device and the activity state of the user, and the method 400 ends.

Figure 5:
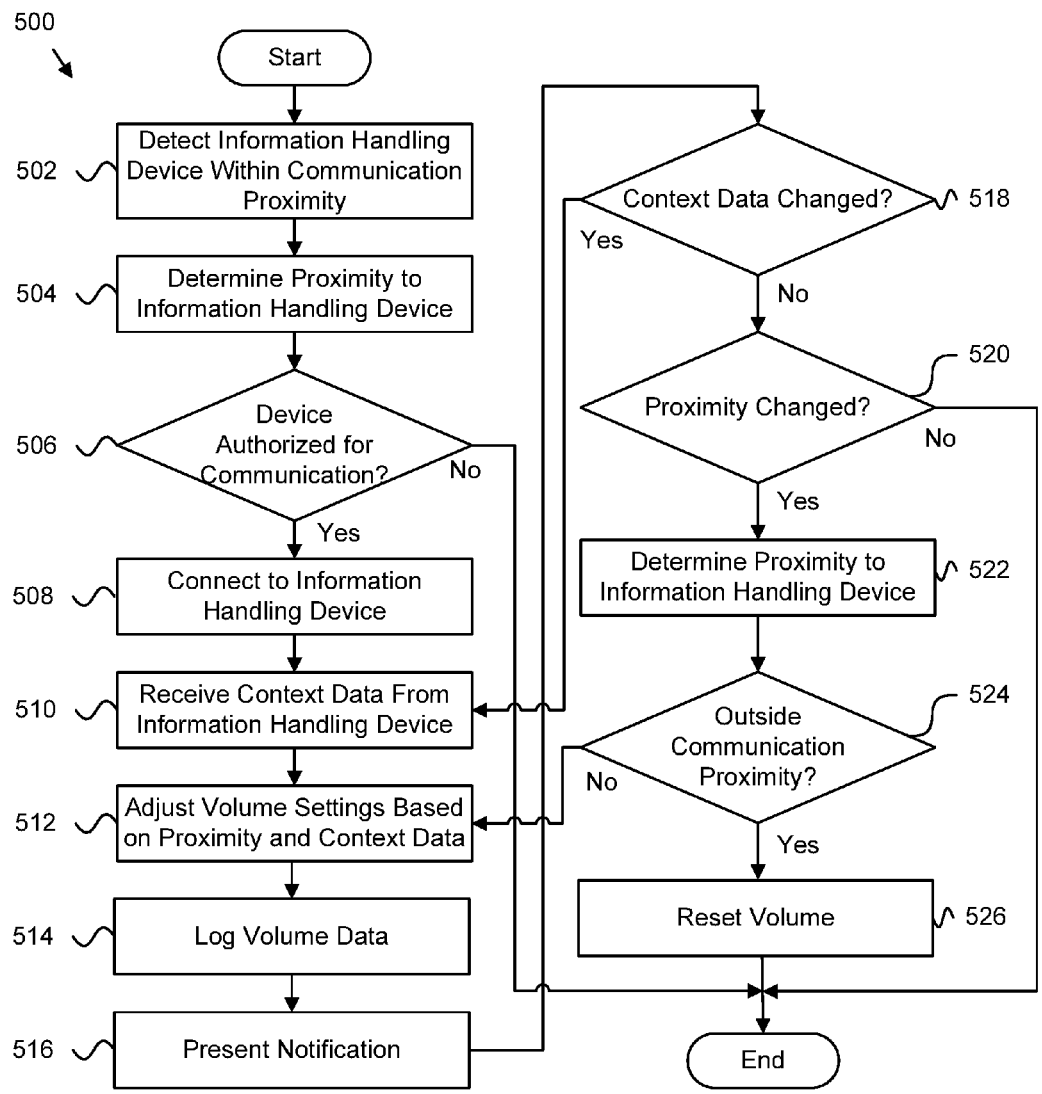
FIG. 5 is a schematic flow chart diagram illustrating one embodiment of another method for adjusting volume settings based on proximity and activity data.

FIG. 5 is a schematic flow chart diagram illustrating one embodiment of another method 500 for adjusting volume settings based on proximity and activity data. In one embodiment, the method 500 begins, and a proximity module 202 detects 502 a trigger device is within a communication proximity of a target device. In a further embodiment, the proximity module 202 determines 504 a proximity of the target device to the trigger device.

If the authorization module 304, in one embodiment, determines 506 the trigger device is not authorized to communicate with the target device, the method 500 ends. Otherwise, the connection module 302, in one embodiment, connects 508 the target device to the trigger device. In some embodiments, the activity module 204 receives 510 context data from the trigger device 102 that describes an activity state for a user of the trigger device.

In one embodiment, the volume module 206 adjusts 512 one or more volume settings for the target device based on the determined proximity to the trigger device and the determined activity state of the user of the trigger device. In one embodiment, the notification module 306 logs 514 the volume adjustment details in a log or history associated with the target device. The notification module 306, in a further embodiment, presents 516 a notification to the user on the target device that notifies the user that one or more volume settings have been changed on the target device and/or reasons why the volume settings were changed.

In some embodiments, if the activity module 204 determines 518 that the context data associated with the user of the trigger device has changed, the activity module 204 receives 510 new context data from the trigger device, which the volume module 206 may use to adjust 512 one or more volume settings of the target device. Otherwise, if the proximity module 202 determines 520 that proximity of the target device to the trigger device has changed, meaning the distance between the devices has changed, the proximity module 202 determines 522 the new proximity to the trigger device. Otherwise, the method 500 ends.

In one embodiment, if the proximity module 202 determines 524 that the new proximity to the trigger device is not outside a communication proximity, the volume module 206 adjusts 512 one or more settings of the target device based on the new proximity. Otherwise, the volume module 206 resets 526 one or more adjusted volume settings of the target device to a previous volume setting, and the method 500 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a first information handling device, the first information handling device comprising a mobile device;
   a processor of the first information handling device;
   a memory that stores code executable by the processor to:
      determine a proximity of the first information handling device to a second information handling device in response to detecting the second information handling device, the second information handling device comprising a mobile device;
      receive context data from the second information handling device, the context data comprising biometric data for a user of the second information handling device, the biometric data indicating an activity state of the user; and
      adjust a volume setting of the first information handling device as a function of the proximity of the first information handling device to the second information handling device and the activity state of the user.

2. The apparatus of claim 1, wherein the code is further executable by the processor to determine, from the context data received from the second information handling device, whether the user's activity state is a quiet state, the context data further comprising one or more of calendar data and location data.

3. The apparatus of claim 2, wherein the code adjusts the volume setting of the first information handling device by decreasing a volume level below a predetermined volume level in response to determining that the user's activity state is a quiet state.

4. The apparatus of claim 3, wherein the predetermined volume level is determined according to the determined proximity of the first information handling device to the second information handling device.

5. The apparatus of claim 1, wherein the code is further executable by the processor to connect the first information handling device to the second information handling device using a short-range wireless communication protocol, the short-range wireless communication protocol selected from the group consisting of a Bluetooth® protocol, a near field communication ("NFC") protocol, an infrared protocol, and a Wi-Fi protocol.

6. The apparatus of claim 1, wherein the code is further executable by the processor to:
   determine a different proximity of the first information handling device to the second information handling device in response to detecting a change in the determined proximity; and
   adjust the volume setting of the first information handling device as a function of the different proximity.

7. The apparatus of claim 1, wherein the code is further executable by the processor to:
   receive different context data at the first information handling device from the second information handling device in response to determining a change in the activity state of the user of the second information handling device; and
   adjust the volume setting of the first information handling device as a function of the user's changed activity state.

8. The apparatus of claim 1, wherein the code is further executable by the processor to adjust the volume setting of the first information handling device in response to one of determining the proximity of the first information handling device to the second information handling device and detecting an event that generates an audible sound.

9. The apparatus of claim 1, wherein the code is further executable by the processor to adjust the volume setting of the first information handling device in response to determining the second information handling device is an authorized information handling device.

10. The apparatus of claim 1, wherein the code is further executable by the processor to notify a user of the first information handling device that the volume setting has been changed in response to the volume setting being adjusted.

11. The apparatus of claim 1, wherein the proximity of the first information handling device to the second information handling device is determined using one or more sensors, the one or more sensors selected from the group consisting of a Bluetooth® communication sensor, a signal strength sensor, a location sensor, an altimeter, and a proximity sensor.

12. The apparatus of claim 1, wherein the second information handling device is selected from the group consisting of a wearable activity tracker, a smart phone, and a tablet computer.

13. The apparatus of claim 1, wherein the volume setting of the first information handling device is associated with one or more of a speakerphone volume, a notification volume, a ringer volume, a music volume, a video volume, a game volume, and a voice response volume.

14. A method comprising:
   determining, by use of a processor, a proximity of a first information handling device to a second information handling device in response to detecting the second information handling device, the first and second information handling devices comprising a mobile devices;
   receiving context data from the second information handling device, the context data comprising biometric data for a user of the second information handling device, the biometric data indicating an activity state of the user; and
   adjusting a volume setting of the first information handling device as a function of the proximity of the first information handling device to the second information handling device and the activity state of the user.

15. The method of claim 14, further comprising determining, from the context data received from the second information handling device, whether the user's activity state is a quiet state, the context data further comprising one or more of calendar data and location data.

16. The method of claim 15, wherein the volume setting of the first information handling device is adjusted by decreasing a volume level below a predetermined volume level in response to determining that the user's activity state is a quiet state, the predetermined volume level being determined according to the determined proximity of the first information handling device to the second information handling device.

17. The method of claim 14, further comprising:
   determining a different proximity of the first information handling device to the second information handling device in response to detecting a change in the determined proximity; and
   adjusting the volume setting of the first information handling device as a function of the different proximity.

18. The method of claim 14, further comprising:
   receiving different context data at the first information handling device from the second information handling device in response to determining a change in the activity state of the user of the second information handling device; and
   adjusting the volume setting of the first information handling device as a function of the user's changed activity state.

19. The method of claim 14, further comprising resetting the volume setting of the first information handling device to a previous volume setting in response to determining one or more of the second information handling device is outside of a communication proximity of the first information handling device and the user's activity state is not a quiet state.

20. A program product comprising a computer readable storage medium that is not a transitory signal that stores code executable by a processor, the executable code comprising code to perform:
   determining a proximity of a first information handling device to a second information handling device in response to detecting the second information handling device, the first and second information handling devices comprising mobile devices;
   receiving context data from the second information handling device, the context data comprising biometric data for a user of the second information handling device, the biometric data indicating an activity state of the user; and
   adjusting a volume setting of the first information handling device as a function of the proximity of the first information handling device to the second information handling device and the activity state of the user.

* * * * *